United States Patent [19]

Yoshida

[11] Patent Number: 5,088,030
[45] Date of Patent: Feb. 11, 1992

[54] BRANCH ADDRESS CALCULATING SYSTEM FOR BRANCH INSTRUCTIONS

[75] Inventor: Toshiya Yoshida, Kanagawa, Japan

[73] Assignee: Kabushiki Kaisha Toshiba, Kawasaki, Japan

[21] Appl. No.: 391,665

[22] Filed: Aug. 8, 1989

Related U.S. Application Data

[63] Continuation of Ser. No. 934,784, Nov. 25, 1986, abandoned.

[30] Foreign Application Priority Data

Mar. 28, 1986 [JP] Japan .................. 61-068409

[51] Int. Cl.⁵ .............. G06F 9/32; G06F 9/28
[52] U.S. Cl. .................. 364/275; 364/231.8;
364/261.3; 364/260; 364/259.8; 364/358;
364/931.43; 364/938; 364/948.34; 364/DIG. 1;
364/DIG. 2
[58] Field of Search ............ 364/200 MS, 900 MS

[56] References Cited

U.S. PATENT DOCUMENTS

| | | | |
|---|---|---|---|
| 3,881,173 | 4/1974 | Larsen et al. | 364/200 |
| 4,197,578 | 4/1980 | Wada et al. | 364/200 |
| 4,398,245 | 8/1983 | Fujita | 364/200 |
| 4,399,507 | 8/1983 | Cosgrove et al. | 364/200 |
| 4,454,578 | 6/1984 | Matsumoto et al. | 364/200 |
| 4,530,050 | 7/1985 | Fukanaga et al. | 364/200 |
| 4,541,047 | 9/1985 | Wada et al. | 364/200 |
| 4,594,655 | 6/1986 | Hao et al. | 364/200 |
| 4,616,313 | 10/1986 | Aoyagi | 364/200 |
| 4,862,346 | 8/1989 | Wagner et al. | 364/200 |
| 4,873,630 | 10/1989 | Rusterholz et al. | 364/200 |
| 3,840,0861 | 10/1974 | Amdahl et al. | 364/200 |

OTHER PUBLICATIONS

Andrew S. Tanenbaum, Structured Computer Organization, second edition, 1984, pp. 23-24.
IBM Technical Disclosure Bulletin, vol. 24, No. 1A, Jun. 1981; "Address Generate Interlock Avoidance for Branch Instructions in a Branch-History-Table Processor".

Primary Examiner—Thomas C. Lee
Assistant Examiner—Mehmet Geckil
Attorney, Agent, or Firm—Foley & Lardner

[57] ABSTRACT

In the conventional branch address calculator for an advance control processor, when a branch instruction reaches the execution step, a decision is first made as to whether the branch instruction is conditional or non-conditional, and then a target branch address (logical address) is calculated before the branch instruction is executed, so that the processing speed is slow. To increase the processing speed, a target branch address is previously calculated before a branch instruction reaches the execution step. Since the branch instruction can be executed immediately after the condition of the branch instruction has been decided, it is possible to eliminate the time required to calculate the target branch address after the instruction has reached the execution step.

6 Claims, 3 Drawing Sheets

BRANCH ADDRESS CALCULATING SYSTEM FOR BRANCH INSTRUCTIONS

This application is a continuation of application Ser. No. 06/934,784, filed Nov. 25, 1986, now abandoned.

BACKGROUND OF THE INVENTION

1. Field of the Invention

The present invention relates generally to a branch instruction control system and more specifically to a branch instruction address calculating circuit incorporated in a processor of an advance control method or pipe line processing method.

2. Description of the Prior Art

In up-to-date microprocessors, an advance control method (pipe line processing method) has been adopted to increase the processing speed. In the pipe line processing method, the processing of an instruction is divided into several stages; each divided instruction is processed at each stage in parallel; and further the succeeding instruction to be processed next is read or decoded when the current instruction is being executed at each stage (referred to as advance control).

In the above-mentioned microprocessor for an advance control method, a target branch address of a branch instruction is first calculated, and then the branch instruction (jumping instruction) is executed.

In the prior art branch instruction control system, however, since the branch address is calculated after the branch instruction has reached the execution step, it takes a long execution time for the branch instruction processing and thus the processing speed of the processor is reduced.

The configuration of the prior art branch instruction control system will be described in further detail hereinafter with reference to FIG. 1 under DETAILED DESCRIPTION OF THE PREFERRED EMBODIMENT.

SUMMARY OF THE INVENTION

With these problems in mind, therefore, it is the primary object of the present invention to provide a branch instruction control system which can reduce the execution time required for branch instructions and thereby to increase the processing speed of the processor.

To achieve the above-mentioned object, the branch instruction control system according to the present invention comprises: (a) register means for storing a head address of a branch instruction before the branch instruction reaches an execution step; (b) decoder means for decoding a branch instruction to output information as to a branch instruction word length and a displacement from the head address of the succeeding instruction to a target branch address; (c) adder means responsive to the register means and decoder means for determining a target branch address by calculating the sum total of the branch instruction word length, the head address and the displacement from the head address of the succeeding instruction to the target address; (d) branch instruction reading means for reading an instruction from the calculated target branch address; and (e) branch instruction executing means for executing the read instruction.

The adder means comprises (a) a first adder for adding a branch instruction word length and a head address; and (b) a second adder for adding an added value of the first adder and a displacement to a target branch address from the head address of the succeeding instruction.

The output of the first adder is applied to the register means to update the head address of the register means.

As described above, in the system according to the present invention, target branch addresses of branch instructions can be obtained by adding a head address, a word length and a displacement between the head address of the succeeding instruction and the target address, before branch instructions are executed. Therefore, it is possible to reduce the execution time of the processor. In the pipe line system, once the execution time can be reduced, it is possible to reduce the processing time by dividing the processing into several stages.

BRIEF DESCRIPTION OF THE DRAWINGS

The features and advantages of the branch instruction control system according to the present invention will be more clearly appreciated from the following description taken in conjunction with the accompanying drawing and in which.

DETAILED DESCRIPTION OF THE PREFERRED EMBODIMENTS

To facilitate understanding of the present invention, reference will be made to a prior-art branch instruction control system with reference to the attached drawing.

Figure 1:
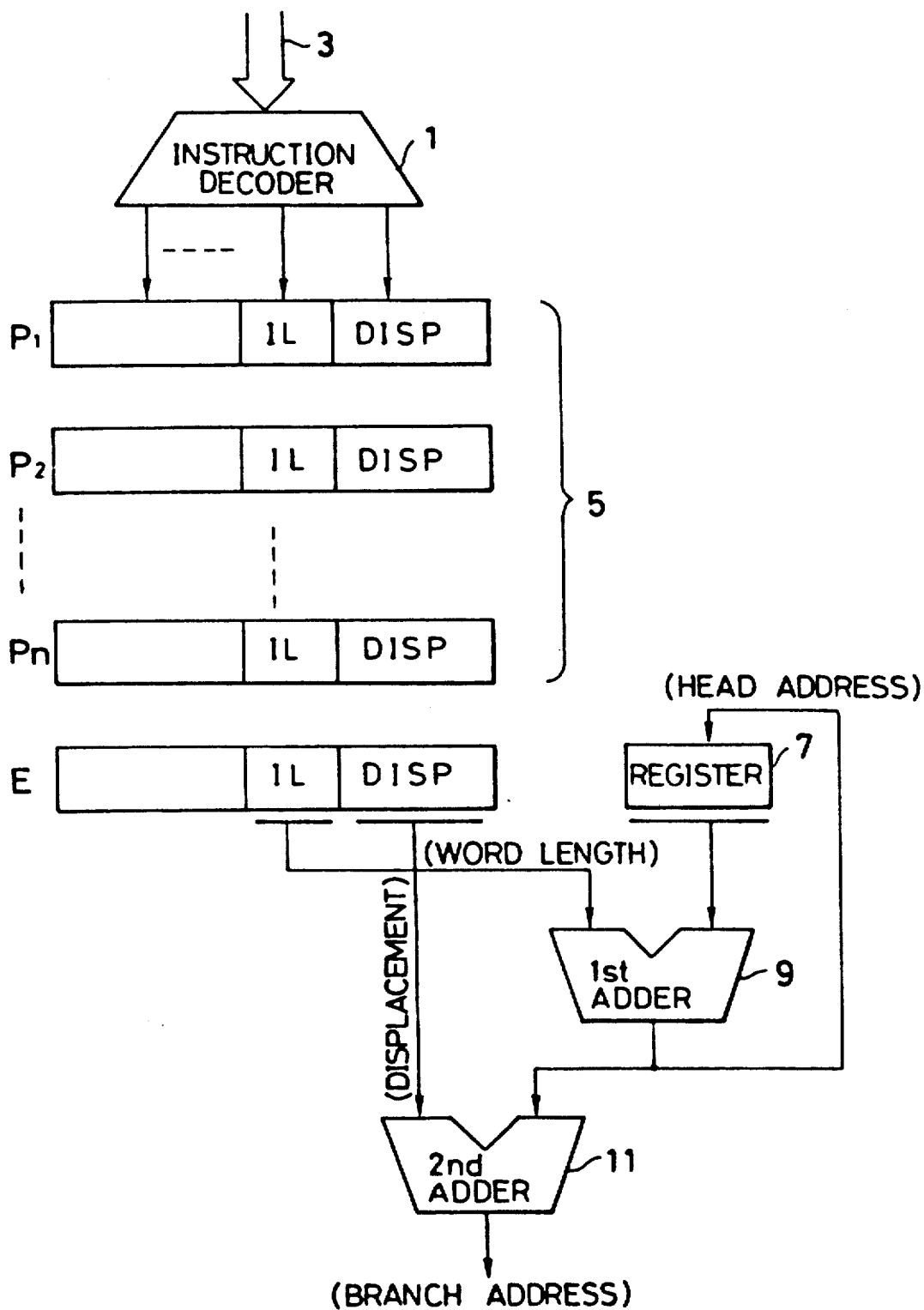
FIG. 1 is a block diagram of the prior art branch instruction control system.

FIG. 1 is a prior-art branch address calculator incorporated in a branch instruction control system of advance control type or a pipe line processing type.

In FIG. 1, an instruction decoder 1 decodes instructions each composed of machine language supplied through a data bus line 3. A branch instruction decoded by the instruction decoder 1 is stored in each stage pipe line in such a way that the word length thereof is stored in an area designated by IL and the displacement thereof to a target branch address is stored in an area designated by DISP.

A branch instruction decoded as described above reaches an execution step (E) after having passed through an n-stage pipe line ($P_1, P_2 \ldots P_n$) 5 in the advance control type pipe line processing system. The instant the branch instruction reaches the execution step (E), a target branch address of the branch instruction is first calculated before this branch instruction is executed.

The target branch address of the branch instruction reaching the execution step (E) is calculated as follows: A head address of the branch instruction reaching the execution step (E) is held by a register 7 and added to an instruction word length of the branch instruction reaching the execution stage (E) by a first adder 9. Further, the added value (Head address + instruction word length) is added to a displacement relative to a target branch instruction reaching the execution step (E) by a second adder 11 to obtain a target branch address of the branch instruction.

As described above, in the prior art branch address calculator adopted in the advance control method, the branch instruction is first decoded by the instruction decoder 1 and then the target branch address of the branch instruction is calculated after this branch instruction has been passed through the n-stage pipe line 5 and has reached the execution step (E). Therefore, the branch instruction is not executed, even if reaching the execution step (E), until the target branch address has completely been calculated. Thus, a relatively long execution time is required to execute the branch instruction.

In other words, since the target branch address is calculated after the branch instruction has reached the execution step (E), it takes a long time to execute a branch instruction and therefore it is impossible to process branch instructions at a high speed.

In view of the above description, reference is now made to an embodiment of the branch instruction control system according to the present invention.

Figure 2:
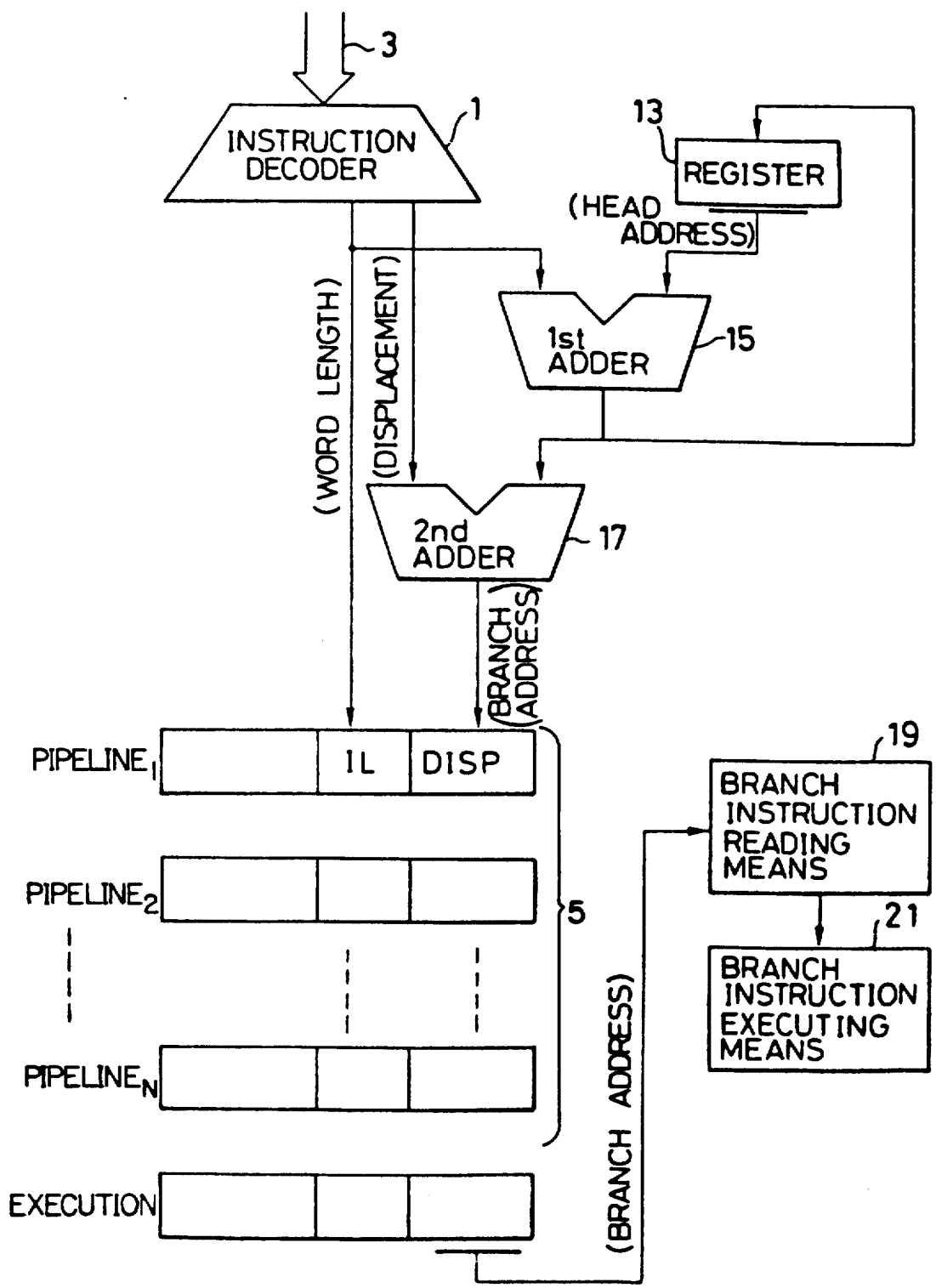
FIG. 2 is a block diagram of an embodiment of the branch instruction control system according to the present invention.

FIG. 2 shows an embodiment of the branch instruction control system according to the present invention. In this branch instruction control system, the target branch address of a branch instruction to be processed in the advance control method can be calculated before the branch instruction reaches the execution step (E).

Further, the elements or sections having the same reference numerals shown in FIG. 1 have the same functions, so that the description thereof is omitted herein.

A branch address calculator for a branch instruction is made up of a register 13, a first adder 15 and a second adder 17.

The register 13 holds a head address of an instruction supplied to an instruction decoder 1 through a data bus line 3 and decoded by the instruction decoder 1. Therefore, when instructions decoded by the instruction decoder 1 are branch instructions, this register 13 functions as storage means for storing the head address of the branch instructions.

The first adder 15 adds a branch instruction head address held in the register 13 to a word length of an instruction decoded by the instruction decoder 1. The added value (a word length + a head address) is supplied back to the register 13 to update the head address stored therein and also to the second adder 17.

The second adder 17 adds the value obtained by the first adder 15 (an instruction word length + a head address) to an instruction displacement from a head address of the succeeding instruction to a target address (decoded by the decoder 1) in order to obtain a target head address of an instruction to be processed next. Therefore, if the instruction decoded by the instruction decoder 1 is a branch instruction, the value obtained by the second adder 17 represents a target address of the branch instruction. The value added through this second adder 17 is stored at an area designated by DISP allocated to the first stage pipe line P1.

Further, the instruction word length of an instruction decoded by the instruction decoder 1 is stored at an area designated by IL also allocated to this first stage pipe line (P$_1$).

The operation of the branch address calculator of the branch instruction control system according to the present invention thus configured will be described hereinbelow.

When a branch instruction expressed by machine language is supplied to the instruction decoder 1 through the data bus line 3, the branch instruction is decoded by the instruction decoder 1.

A word length of the decoded branch instruction is stored at an area designated by IL allocated to the first-stage pipe line (P$_1$) and simultaneously supplied to the first adder 15. Further, a relative displacement (from the head address of the succeeding instruction to the target address) decoded by the instruction decoder 1 is supplied to the second adder 17.

The head address of the branch instruction held by the register 13 is added to the word length of the branch instruction through the first adder 15. Simultaneously, the added value is supplied to the register 13 and the second adder 17. The added value supplied to the register 13 is held by the same register 13 to update the register 13. The relative displacement of the branch instruction decoded by the instruction decoder 1 is added to the added value of the first adder 15 through the second adder 17. The added value of the second adder 17 represents a target branch address of the branch instruction. This branch address is stored at an area DISP of the first-stage pipe line (P$_1$).

Thereafter, the branch instruction whose branch address is stored in the area DISP is passed through the n-stage pipe line 5 to the execution step (E). Therefore, the target branch address of the branch instruction can be determined before the branch instruction reaches the execution step (E).

A branch instruction reading means 19 reads an instruction from the target branch address in response to the calculated target branch address. A branch instruction executing means 21 executes the read instruction.

Figure 3:
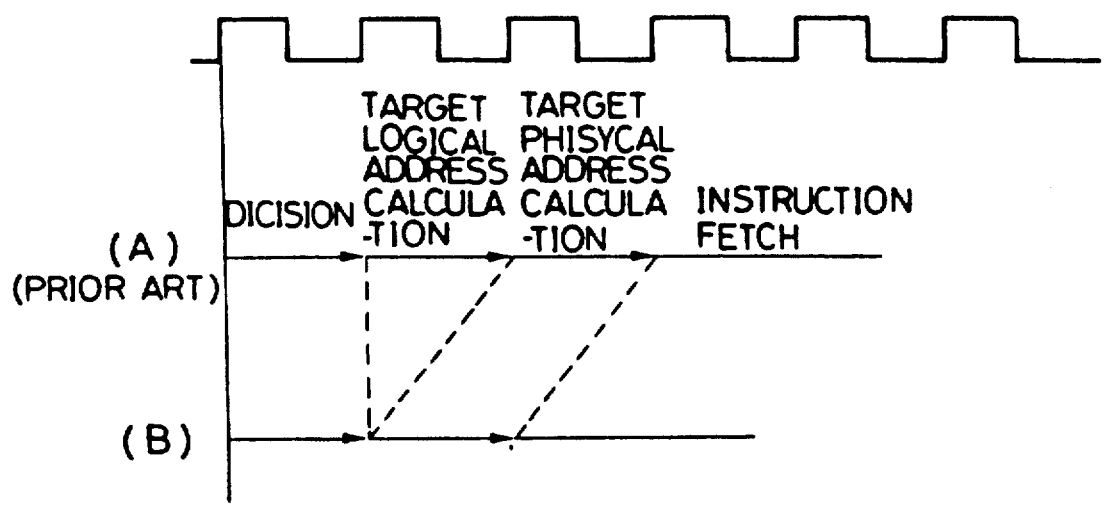
FIG. 3 is a timing chart of the two branch instruction control systems shown in FIGS. 1 and 2, for comparison between the two.

FIG. 3 shows a timing chart of a branch instruction attained after the execution step (E), in which (A) indicates the case of the prior art branch instruction control system and (B) indicates the case of the control system of the present invention for comparison therebetween.

In the prior art system, when the branch instruction reaches the execution step (E), a decision is made as to whether this branch instruction is an unconditional branch instruction or a conditional branch instruction. Thereafter, the target branch address (logical address) of the branch instruction is calculated, and converted into a physical address for a storage unit (not shown) in which an instruction at the target branch address is stored, so that an instruction designated by the target branch address can be fetched.

In contrast with this, in the present invention as shown in FIG. 3, since the branch instruction reaching the execution step (E) has already included the target branch address (logical address) stored in the area DISP of the n-stage pipe line 5, immediately after the presence and absence of the branch condition of a branch instruction has been determined, the target branch address is converted into a physical address, so that the instruction designated by the target branch address can be fetched. Therefore, it is possible to reduce the execution time of the branch instruction by the time corresponding to that required for calculating the target logical address.

As described above, in the present invention, since the target address of a branch instruction can be calculated before the branch instruction reaches the execution step, the branch instruction reaching the execution step can immediately be processed without calculating the target branch address of the branch instruction, so that it is possible to reduce the execution time of the branch instruction and therefore to provide a high speed branch instruction control system.

What is claimed is:

1. An apparatus comprising:

a processing pipeline including a plurality of successive processing stages and an execution stage, wherein said processing stages receive individual instructions to be executed and transfer each instruction to said execution stage where it is executed;

a branch address instruction control system coupled to said processing pipeline; and an instruction decoder means coupled to said processing pipeline and said branch address instruction control system for decoding said instructions to be executed in said pipeline processing stages and simultaneously transferring decoded instructions to said processing pipeline and to said branch address instruction control system;

wherein said branch address instruction control system calculates a target branch address of a branch instruction decoded by said instruction decoder and applies said target branch address to one of said successive processing stages preceding said execution stage in said processing pipeline wherein address calculation and decoding operations are operated simultaneously in parallel which enables the decode operation and address calculation to occur in the same machine cycle.

2. An apparatus according to claim 1, wherein said branch address instruction control system is is coupled to the first successive processing stage of said processing pipeline.

3. An apparatus according to claim 1, further comprising:

a branch instruction reading means for reading an instruction located at said target branch address; and branch instruction executing means for executing said instruction read by said branch instruction reading means.

4. The branch instruction control system as set forth in claim 3, wherein said branch instruction executing means determines the presence or absence of branch instruction condition.

5. An apparatus comprising:

a processing pipeline including a plurality of successive processing stages and an execution stage, wherein said processing stages receive individual instructions to be executed and transfer each instruction to said execution stage where it is executed;

a branch address instruction control system coupled to said processing pipeline, said branch address instruction control system including a register for storing a head address of the branch instruction, a first adder for adding a head address stored in said register to the instruction word length decoded by said decoder, and a second adder for adding an address value obtained by said first adder and a displacement from the head address of the succeeding instruction to a target address in order to calculate said target branch address; and an instruction decoder means coupled to said processing pipeline and said branch address instruction control system for decoding said instructions to be executed in said pipeline processing stages and simultaneously transferring decoded instructions to said processing pipeline and to said branch address instruction control system;

wherein said branch address instruction control system calculates a target branch address of a branch instruction decoded by said instruction decoder and applies said target branch address to one of said successive processing stages preceding said execution stage in said processing pipeline.

6. The branch instruction control system as set forth in claim 5, wherein an output of said first adder is applied to said register to update the head address stored in said register.

* * * * *